United States Patent [19]

Mack et al.

[11] Patent Number: 4,525,468
[45] Date of Patent: Jun. 25, 1985

[54] OLEFIN POLYMERIZATION CATALYST

[75] Inventors: Mark P. Mack; Mark L. Shannon, both of Ponca City, Okla.

[73] Assignee: E. I. du Pont de Nemours and Company, Wilmington, Del.

[21] Appl. No.: 489,687

[22] Filed: Apr. 28, 1983

Related U.S. Application Data

[63] Continuation-in-part of Ser. No. 429,632, Sep. 30, 1982, Pat. No. 4,440,869.

[51] Int. Cl.$^3$ .................................................. C08F 4/64
[52] U.S. Cl. .................................... 502/104; 502/113; 526/114; 526/116
[58] Field of Search ............... 502/104, 117, 119, 125, 502/133, 134, 113

[56] References Cited

U.S. PATENT DOCUMENTS 3,135,809  6/1964  Bosmajian ..................... 502/103 X
4,440,869  4/1984  Shannon et al. ..................... 502/104

Primary Examiner—Patrick P. Garvin
Attorney, Agent, or Firm—Cortlan R. Schupbach

[57] ABSTRACT

High activity catalysts for the polymerization of ethylene and other α-olefins are made by contacting a soluble magnesium compound of the general formula Mg(O-SiR$^1$R$^2$R$^3$)$_2$, wherein each of R$^1$, R$^2$, and R$^3$ is, independently, alkyl, alkoxy or aryl with a metal alkoxide, or a mixture of a titanium tetraalkoxide with an alkoxide of another transition metal, in a saturated aliphatic hydrocarbon solution, followed by chlorination and precipitation by a suitable chlorinating agent. These catalysts show high activity for the polymerization of ethylene, especially under slurry polymerization conditions.

8 Claims, No Drawings

OLEFIN POLYMERIZATION CATALYST

This is a continuation-in-part of application Serial No. 429,632 filed Sept. 30, 1982 and now U.S. Pat. No. 4,440,869.

This invention relates to a method for preparing catalysts having high activity for the polymerization of alpha-olefins. More specifically, this invention relates to catalysts prepared by a method comprising contacting a soluble magnesium compound with a metal alkoxide or a mixture of a titanium tetra-alkoxide with an alkoxide of another transition metal in a saturated aliphatic hydrocarbon solution, followed by chlorination and precipitation by a suitable chlorinating agent. The method allows a fine control of atomic ratios within the catalyst, leading to high activity and reproducibility.

It has long been recognized that highly active olefin polymerization catalysts can be made by supporting a titanium chloride species on a magnesium halide or oxide species. In some cases suitable electron donating compounds have been used in such synthesis. Many of these procedures have suffered from being either lengthy or complex and further require extensive washings of the catalysts. These extensive washings can reduce catalyst efficiency through partial poisoning from impurities. Likewise, these procedures produce waste streams containing compounds which require purification before disposal or recycling.

Representative but non-exhaustive of the art in which silicon containing catalysts are made and used include U.S. Pat. No. 4,245,071 which utilizes trimethyl silanol materials and requires magnesium metal as a component. Washing steps are required, producing an insoluble catalyst which does not permit control of the various catalytic ratios to the extent desired.

U.S. Pat. No. 4,324,690 uses organosilicone as an electron donor by treating magnesium with polysiloxane. This method uses an insoluble support, and thus lacks catalytic ratio control. U.S. Pat. No. 3,987,233 uses silicon containing materials and halogenates immediately after support is formed, resulting in a lack of control over catalytic ratios.

U.S. Pat. No. 4,374,755 teaches that magnesium bis(-siloxides) can be formed by a variety of methods and that such materials were useful as the support for forming olefin polymerization catalysts. However, this reference deals with magnesium bis(siloxides), including insoluble species and does not teach or suggest methods for achieving highest activity through atomic ratio control within the catalyst formed.

It would therefore be of great benefit to provide a catalyst having the advantages of high activity, while eliminating the need for washing detrimental catalyst residues from the polymer and which is prepared in a simple, efficient process.

It is therefore an object of the present invention to provide a method for obtaining a highly active olefin polymerization catalyst useful for slurry, gas phase or solution polymerizations which is soluble in hydrocarbons through the preparation procedure, thereby permitting close control of atomic ratios within the catalyst species. The solubility of the reactants during preparation allows ease of handling in addition to atomic ratio control.

It is therefore an object of the present invention to provide a method for preparing highly active olefin polymerization catalysts. Other objects will become apparent to those skilled in this art as the description proceeds.

We have discovered that catalysts having high activity can be prepared by a process comprising contacting, in the substantial absence of a proton donor, a hydrocarbon soluble magnesium compound of the general formula $$Mg(OSiR^1R^2R^3)_2$$

with at least one transition metal alkoxide having a general formula selected from the group consisting of
  (a) $M^1(OR^4)_4$ where $M^1$ is at least one metal selected from the group consisting of titanium, zirconium vanadium and hafnium,
  (b) $[M^2(OR^4)_4]_2$ and $M^2O(OR^4)_3$ wherein $M^2$ is vanadium,
  (c) $[M^3(OR^4)_5]_2$ where $M^3$ is at least one material selected from the group consisting of niobium and tantalum, and
  (d) $M^4O_2(OR^4)_2$ and $M_2^4O_3(OR^4)_2$ where $M^4$ is chromium, in a saturated aliphatic hydrocarbon solvent to form a solution, then forming a precipitate by chlorinating the solution in the substantial absence of free oxygen and recovering the precipitate for use as a catalyst, wherein each of $R^1$, $R^2$ and $R^3$ is, independently, alkyl groups and alkoxy groups containing from 1 to about 20 carbon atoms and aryl groups, aryloxy groups, cycloalkoxy groups or cycloalkyl groups containing from 6 to 14 carbon atoms and wherein each $R^4$ is, independently, alkyl groups or etherically substituted alkyl groups containing from 1 to 20 carbon atoms, aryl groups, cycloalkyl groups or etherically substituted aryl groups or cycloalkyl groups containing from 6 to 14 carbon atoms and $M^1$ is titanium, zirconium, vanadium and hafnium, $M^2$ is vanadium, $M^3$ is niobium or tantalum, and $M^4$ is chromium. Tungsten and molybdenum alkoxides have no general formula, but can also be used. Vanadium is usually present in the dimer form, but is commonly referred to as being in the same form as titanium and zirconium. These forms are interchangeable in this invention. Titanium alone or mixtures of titanium with zirconium are preferred, since titanium balances resultant polymer properties.

In preparing these catalysts, the magnesium bis(siloxide) compounds must be soluble in saturated aliphatic hydrocarbon solvent. Solubility in the hydrocarbon should be measured at temperatures of from −10° C. to about 100° C. and preferably from about 0° C. to about 40° C. In general, the test of soluble materials is one capable of forming a solution in a hexane, said solution having a strength of at least 0.01 molar (based on magnesium) at 25° C. However, other saturated aliphatic hydrocarbon solvents will all be useful. Representative but non-exhaustive examples of such solvents include n-pentane, n-octane, n-hexane, cycloheptane, cyclohexane, methylcyclohexane, isooctane, neopentane, and isomers, cogenors and mixtures of these materials.

Representative but non-exhaustive examples of suitable titanium alkoxides (titanates) are isopropyl titanate, n-butyl titanate, phenyl titanate, di(isopropyl) bis(2-ethoxyethyl) titanate, tetramethyl titanate, tetrachclohexyl titanate, tetra-n-octadecyl titanate, di-iso-propyl bis(2-(2-n-dodecanoxyethoxy ethyl) titanate. Analogous compounds of vanadium and zirconium can be used.

Representative but non-exhaustive examples of vanadium alkoxides are vanadium tri-n-propoxide oxide, vanadium tri-i-propoxide oxide, vanadium tri-n-butoxide oxide, vanadium trimethoxide oxide, vanadium di-i-propoxide-2-ethoxyethoxide oxide, vanadium tri-n-octadecoxide oxide. vanadium tetrethoxide dimer, vanadium tetra-n-propoxide dimer, vanadium tetra-i-propoxide dimer, vanadium di(isopropoxide)bis(2-ethoxyethoxide) dimer and monomer, vanadium di(isopropoxide) bis (2-(2-n-dodecanoxyethoxy-ethoxide) dimer and monomer, vanadium tetra-n-octadecoxide dimer.

Representative but non-exhaustive examples of zirconium alkoxides are zirconium tetra(isopropoxide), zirconium tetra(n-butoxide), zirconium tetra(phenoxide), zirconium di(isopropoxide) bis(2-ethoxyethoxide), zirconium tetra(methoxide), zirconium tetra(cyclohexoxide), zirconium tetra(n-octadecoxide), zirconium di(isopropoxide) bis(2-(2-n-dodecanoxyethoxy) ethoxide).

Representative but non-exhaustive examples of niobium alkoxides are niobium pentaethoxide dimer, niobium penta-n-propoxide dimer, niobium penta-i-propoxide dimer, niobium penta-n-butoxide dimer, niobium penta-n-octadecoxide dimer, niobium tri(isopropoxide) bis(2-ethoxyethoxide) dimer and monomer, niobium-(isopropoxide)(2-ethoxyethoxide) dimer and monomer (mixture of alkoxide substitution), niobium (isopropoxide)(2-2-n-dodecanoxyethoxy)ethoxide) dimer or monomer (again - mixture of substitutions), niobium pentamethoxide dimer.

Representative but non-exhaustive examples of hafnium alkoxides are hafnium tetra(isopropoxide), hafnium tetra(n-butoxide), hafnium tetra(phenoxide), hafnium di(isopropoxide) bis(2-ethoxyethoxide), hafnium tetra(methoxide), hafnium tetra(cyclohexoxide), hafnium tetra (n-octadecoxide), hafnium di(isopropoxide) bis(2-(2-n-dodecanoxyethoxy)ethoxide).

Representative but non-exhaustive examples of tantalum alkoxides are tantalum pentaethoxide dimer, tantalum penta-n-propoxide dimer, tantalum penta-i-propoxide dimer, tantalum penta-n-butoxide dimer, tantalum penta-n-octadecoxide dimer, tantalum tri(isopropoxide) bis(2-ethoxyethoxide) dimer and monomer, tantalum (isopropoxide)(2-ethoxyethoxide) dimer and monomer (mixture of alkoxide substitution), tantalum (isopropoxide)(2-(2-dodecanoxyethoxy) ethoxide) dimer or monomer, tantalum pentamethoxide dimer.

Representative but non-exhaustive examples of chromium alkoxides are di-i-propyl chromate, di-n-propyl chromate, diethyl chromate, dimethyl chromate, di-n-butyl chromate, di-n-octadecyl chromate, bis(2-ethoxyethyl) chromate, bis(2-(2-dodecanoxyethoxyethyl) chromate.

Representative but non-exhaustive examples of tungsten and molybdenum alkoxides are tungsten hexaphenoxide W(OPh)$_6$ and disodium hexamolybdenum tetradecamethoxide (Na$_2${[Mo$_6$(OMe)$_8$](OMe)$_6$}).

The transition metal alkoxides or mixtures of transition metal alkoxides are used in molar ratios based on magnesium to transition metal of from about 0.1 to 1 to about 500 to 1, respectively. Preferably, magnesium to transition metal is used at ratios of from about 0.5 to 1 to about 100 to 1. The most preferred ratios are from about 2 to 1 to about 75 to 1 magnesium to transition metal. The ratio of the mixed transition metals preferably is such that the titanium molar quantity equals or exceeds the total molar quantity of any other transition metal species. Thus, the molar ratio of titanium to the other transition metal species should be at least 1:1 and can be all titanium species, but the ratio of titanium to other transition metal preferably ranges between 1:1 and 100:1 for maximum effect. The invention is illustrated with respect to titanium and titanium-zirconium mixtures.

In the present invention the reaction between the hydrocarbon soluble magnesium bis(siloxides) and the titanium alkoxides or mixture of transition metal alkoxides produce a solution. This reaction forms a soluble catalyst precursor. The active catalyst is formed by chlorinating the solution in substantial absence of free oxygen to form a precipitate and recovering the precipitate for use as a catalyst. Suitable chlorinating agents are compounds of chlorine with a metal, organic group, or hydrogen. The chlorinating agent should preferably be a liquid, a gas, or soluble in the saturated aliphatic hydrocarbon solvent.

The catalyst will contain chlorine to magnesium ratios ranging from about 1 to 1 to about 50 to 1, respectively, while especially preferred ratios are from 20:1 to 2:1, respectively. Representative but non-exhaustive examples of suitable chlorinating agents are hydrogen chloride, ethylaluminum dichloride, silicon tetrachloride, carbon tetrachloride, boron trichloride, phosphorus trichloride, diethylaluminum chloride, ethylaluminum sesquichloride, tin tetrachloride, trichlorosilane (HSiCl$_3$), aluminum trichloride, ethylboron dichloride, diethylboron chloride, chloroform, phosphorus oxytrichloride (POCl$_3$), acetyl chlorides, thionyl chloride, sulfur chloride, methyl trichlorosilane, dimethyl dichlorosilane, titanium tetrachloride, vanadium tetrachloride and vanadium pentachloride. Of these diethylaluminum chloride, ethylaluminum dichloride, and ethylaluminum sesquichloride are preferred.

The chlorinating step should be carried out in the substantial absence of free oxygen. Therefore, as is common with such catalysts, inert atmosphere should be used. Inert atmospheres can be nitrogen, argon, or a gas such as is non-reactive toward the reagents used or the reaction product. The gas should contain essentially no oxygen or water.

Once a precipitate has formed after chlorination, the precipitate can be recovered and used as a solid or added to a polymerization reaction, as formed, in a slurry. Use of the entire reaction mixture slurry as a catalyst is preferred.

Magnesium bis(siloxides) useful in the present invention are those soluble in a hydrocarbon as described. Representative but non-exhaustive examples of suitable materials are bis(butyl dimethyl siloxy) magnesium, bis (butyl methyl phenyl siloxy) magnesium, bis(butyl(2-ethyl-1-hexanoxy) methyl siloxy) magnesium, bis((n-hexyl)(2-ethyl-1-hexanoxy) methyl siloxy) magnesium, bis(di-n-hexyl methyl siloxy) magnesium, bis(methyl butyl (n-octadecanoxy) siloxy) magnesium, bis(methyl butyl (2-(2-n-dodecanoxyethoxy) ethoxy) siloxy) magnesium, and bis(n-hexyl dimethyl siloxy) magnesium.

The process of the present invention provides a simple, efficient and direct preparation of high activity polymerization catalysts. In addition, the activity can be maximized through careful control of atomic ratios within the process. This control is achieved by determining what ratios of reactants are added in each step of the procedure. Thus it is possible to closely control the atomic ratio desired, since the reaction in each step is essentially complete.

Since the materials are all soluble until catalyst formation by chlorination, very homogenous reactions are obtained and no unreacted catalyst particles remain. Thus, substantially complete and even reaction through the catalyst is obtained allowing the high degree of control. Likewise, no waste streams are produced which must be purified, disposed of or recycled. Further, the catalyst does not require washing and can be used as formed to provide a high activity material.

The invention is more concretely described with reference to the examples below wherein all parts and percentages are by weight unless otherwise specified. The examples are provided to illustrate the present invention and not to limit it.

EXAMPLE 1

A catalyst was prepared by placing one gram of $Mg(O(C_6H_5)Si(CH_3)(C_4H_9))_2$ (2.43 mmol) in 2.00 milliliters (ml) of dry degassed cyclohexane, under an argon atmosphere in a reactor and adding 43 microliters (0.046 g, 0.135 mmol) of $Ti(OC_4H_9)_4$ to form a solution. This solution was stirred for 1.0 hour, and then 2.42 g of a 25.5 weight percent solution of ethylaluminum dichloride (EADC, 4.87 mmol) in heptane was added dropwise at room temperature giving a pale purple-gray powder in cyclohexane-heptane slurry. The slurry was diluted to 10 ml of dry, degassed hexane. A 5.00 ml aliquot of the slurry was diluted to 20.00 ml with additional dry, degassed hexane for use in polymerization. Analysis of this diluted slurry showed concentrations of: $Mg=1.6$ mg/ml, $Ti=0.18$ mg/ml, and $Al=3.7$ mg/ml for an atomic ratio of $Mg/Ti/Al=17.9:1.0:37.9$.

EXAMPLE 2

The recovered catalyst of Example 1 was utilized as a slurry in the ethylene polymerization. A 1.7 liter stainless steel autoclave was used for polymerization, wherein 600 ml of dried hexane was saturated with ethylene by repeatedly pressurizing the autoclave to 120 pounds per square inch gauge (psig) with ethylene and venting to 10 psig at 40° C. After saturation, 0.80 ml of a 25% solution of triethylaluminum in heptane and 0.50 ml of the catalyst slurry (0.090 mg as Ti) was added to the reactor. The reactor was pressurized to 55 psig with hydrogen (giving a net partial pressure of 45 psig hydrogen), and to 90 psig with ethylene. The reactor was quickly heated to 85° C. and ethylene was added continuously at this temperature at a 120 psig line pressure. After 1.0 hours, the reaction was terminated. The reaction yielded 145.08 g of polyethylene, (density=0.9618, $MI_2=3.19$, $MI_{20}/MI_2=34.48$) or 1610 Kg PE/g Ti-Hr.

EXAMPLE 9-10

Subsequent polymerizations with the identical catalyst were carried out exactly as described in Exaxmple 2, but the partial pressure of hydrogen was varied. The results of these examples and the molecular weight distribution as described by melt index is set forth in Table 1.

TABLE 1

| Ex | psig $H_2$ | Kg PE/ g Ti-Hr | density | $MI_2$ | $MI_{20}/MI_2$ |
|---|---|---|---|---|---|
| 2 | 45 | 1610 | 0.9618 | 3.19 | 34.48 |
| 3 | 45 | 1630 | 0.9683 | 2.69 | 38.29 |
| 4 | 45 | 1700 | 0.9630 | 3.38 | 32.25 |
| 5 | 30 | 2380 | 0.9602 | 0.836 | 34.33 |
| 6 | 30 | 2620 | 0.9588 | 0.644 | 30.90 |
| 7 | 15 | 3400 | 0.9546 | 0.112 | 33.75 |
| 8 | 15 | 3720 | 0.9534 | 0.099 | 32.53 |
| 9 | 0 | 5790 | 0.9495 | 0.000 | — |

COMPARATIVE EXAMPLE 11

In a 30 ml serum vial, under an inert atmosphere, 2.21 ml of a 0.602 M solution, in hexane, of dibutylmagnesium (1.33 mmole) and 0.64 g of triethylsilanol, (4.84 mmole) were allowed to react and formed a non-soluble slurry. When the product slurry (in hexane) was cool, 2 ml of fresh, dry cyclohexane was added dropwise.

To this slurry was added 33.3 microliters (0.097 mmol) of tetra-n-butyltitanate was added and the resultant slurry stirred for 1 hour. After this period, 2.42 g of a 25.5 weight percent solution of ethylaluminum dichloride in hexane (4.86 mmole as EADC) was added dropwise. The final catalyst slurry was then diluted to 25 ml final volume with more cyclohexane. Analysis showed concentrations of $Al=5.60$ mg/ml, $mg=1.28$ mg/ml, $Ti=0.18$ mg/ml, for molar ratios of $Al/Mg/Ti=54.03/13.71/1.00$.

COMPARATIVE EXAMPLE 12

A catalyst was prepared by closely following the procedure outlined above and using the same reagents in similar amounts. Slower addition of the dibutylmagnesium to a dilute solution of the triethylsilanol in cyclohexane and addition of the ethylaluminum dichloride in parts yielded a catalyst with a more uniform distribution of particle size. Analysis showed concentrations of $Al=5.07$ mg/ml, $Mg=1.56$ mg/ml, and $Ti=0.35$ mg/ml, for a molar ratio of $Al/Mg/Ti=25.63/8.76$.

COMPARATIVE EXAMPLES 13-20

Ethylene polymerizations were carried out using the same procedure but with differing partial pressures of hydrogen. In a 1.7 stainless steel autoclave, 600 ml of dried hexane was saturated with ethylene by repeatedly pressurizing the autoclave to 120 psig with ethylene and venting to 10 psig at 40° C. To this was added 0.8 ml of a 25° solution of triethylaluminum in heptane and 0.5 ml of the catalyst slurry from comparative Example 11 (0.093 mg as Ti). The reactor was pressurized to 55 psig with hydrogen, and to 90 psig with ethylene. The reactor was quickly heated to 85° C. and ethylene was added continuously at this temperature at a 120 psig line pressure. After 1.0 hour, the reaction was stopped and yielded 75.12 g of polyethylene, (density=0.9619, $MI_2=0.940$, $MI_{20}/MI_2$ - 39.15) or 854.7 Kg PE/g Ti-Hr. Results are set forth in Table 2.

TABLE 2

| Comp Ex | Catalyst | PSIG $H_2$ | KgPE/g Ti-hr. | $MI_2$ | $MI_{20}/MI_2$ | Density |
|---|---|---|---|---|---|---|
| 13 | Comp Ex 11 | 45 | 834.7 | 0.940 | 39.15 | 0.9619 |
| 14 | Comp Ex 11 | 30 | 1479 | 0.280 | 37.14 | 0.9570 |
| 15 | Comp Ex 11 | 15 | 2030 | 0.065 | 31.69 | 0.9530 |
| 16 | Comp Ex 11 | 0 | 4184 | 0.000 | — | 0.9431 |
| 17 | Comp Ex 12 | 45 | 1518 | 2.34 | 35.21 | 0.9624 |
| 18 | Comp Ex 12 | 30 | 2080 | 0.494 | 35.83 | 0.9571 |
| 19 | Comp Ex 12 | 15 | 1983 | 0.067 | 36.72 | 0.9543 |

EXAMPLE 21

To 1.00 g of $Mg(OSi(C_6H_5)(CH_3)(C_4H_9))_2$ (2.43 mmole) in 2.00 ml of dry, degassed cyclohexane, under an argon atmosphere, was added to 0.0166 g of $Ti(On-C_4H_9)_4$ (0.0487 mmole) and 0.0159 g of $Zr(O-n-C_3H_7)_4$ (0.487 mmol). This mixture was stirred for 1.0 hour, and then 2.42 g of a 25.5 weight percent solution of ethylaluminum dichloride (4.87 mmole) in heptane was added dropwise at room temperature, giving a pale, purple-gray powder in cyclohexane-heptane slurry.

This was diluted to 10.00 ml with more of the cyclohexane and then a 5.00 ml aliquot was diluted to 20.00 ml with more dry, degassed hexane for use in polymerizations.

Analysis of the dilute slurry showed concentrations of Mg=1.44 mg/ml, Ti=0.080 mg/ml, Zr=0.112 mg/ml, and Al=3,44 mg/ml for a molar ratio of Mg/Ti/Zr/Al=48.24/1.36/1.0/103.68.

The catalyst so prepared was utilized in the polymerization of ethylene as described for comparative examples 13–20. Results are set forth in table 2, wherein all symbols are as set forth in table 1, and tm is transition

TABLE 3

| PSIG/H$_2$ | KgPE/g tm/hr. | KgPE/mmole tm/hr. | MI$_2$ | MI$_{20}$/MI$_2$ | Density |
|---|---|---|---|---|---|
| 45 | 1238 | 82.0 | 2.95 | 30.54 | 0.9620 |
| 45 | 1200 | 79.5 | 2.97 | 31.04 | 0.9623 |
| 45 | 1214 | 80.4 | 2.77 | 28.38 | 0.9722 |
| 30 | 1650 | 109.3 | 0.386 | 50.57 | 0.9593 |
| 30 | 1630 | 108.0 | 0.926 | 31.21 | 0.9499 |
| 30 | 1746 | 115.7 | 0.807 | 30.29 | 0.9586 |
| 15 | 2424 | 160.6 | 0.089 | 33.48 | 0.9537 |
| 15 | 2788 | 184.7 | 0.098 | 26.43 | 0.9525 |
| 0 | 4410 | 292.2 | —+ | —+ | 0.9452 |

—+ not observable

Molecular weight distribution was determined using the ratio MI$_{20}$/MI$_2$, where the result indication the relative distribution, as described by Nielson in *Polymer Rheology*, (1977) Marcel Dekker Pub., N.Y. pp 69–75. In this determination, MI$_2$ is the melt index as determined by ASTM D-1238, Condition F.

While certain embodiments and details have been shown for the purpose of illustrating this invention, it will be apparent to those skilled in this art that various changes and modifications may be made herein without departing from the spirit or scope of the invention.

We claim:

1. A method of preparing catalysts for polymerization of alpha-olefins comprising contacting, in substantial absence of proton donors, a soluble magnesium compound of the general formula Mg(OSiR$^1$R$^2$R$^3$)$_2$ with a titanium alkoxide of the formula Ti(OR$^4$)$_4$ in combination with at least one transition metal alkoxide having a general formula selected from the group consisting of
 (a) M$^1$(OR$^4$)$_4$ wherein M$^1$ is at least one metal selected from the group consisting of zirconium, vanadium and hafnium,
 (b) M$^2$O(OR$^4$)$_3$ wherein M$^2$ is vanadium,
 (c) [M$^3$(OR$^4$)$_5$]$_2$ where M$^3$ is at least one material selected from the group consisting of niobium and tantalum,
 (d) M$^4$O$_2$(OR$^4$)$_2$ and M$^4$$_2$O$_3$(OR$^4$)$_2$ wherein M$^4$ is chromium, and
 (e) at least one material selected from the group consisting of tungsten alkoxides and molybdenum alkoxides,
in a sauturated aliphatic hydrocarbon solvent to form a solution, then forming a precipitate by chlorinating the solution in the substantial absence of free oxygen and recovering the precipitate for use as a catalyst, wherein each of R$^1$, R$^2$ and R$^3$ is, independently, alkyl groups or alkoxy groups containing from 1 to about 20 carbon atoms or aryl groups, aryloxy groups, cycloalkoxy groups or cycloalkyl groups containing from 6 to 14 carbon atoms, and each R$^4$ is, independently, alkyl groups or etherically substituted alkyl groups containing from 1 to 20 carbon atoms, aryl groups, cycloalkyl groups or etherically substituted aryl groups or cycloalkyl groups containing from 6 to 14 carbon atoms.

2. A method as described in claim 1 wherein the transition metal alkoxides are vanadium or zirconium alkoxides selected from the group consisting of vanadium tri-n-propoxide oxide, vanadium tri-i-propoxide oxide, vanadium tri-n-butoxide oxide, vanadium trimethoxide oxide, vanadium (di-i-propoxide)(2-ethoxyethoxide) oxide, vanadium tri-n-octadecoxide oxide, vanadium tetraethoxide dimer, vanadium tetra-n-propoxide dimer, vanadium tetra-i-propoxide dimer, vanadium di(isopropoxide)bis(2-ethoxyethoxide) dimer and monomer, vanadium di(isopropoxide)bis(2-(2-n-dodecanoxyethoxyethoxide) dimer and monomer, vanadium tetra-n-octadecoxide dimer; zirconium tetra(isopropoxide), zirconium tetra(n-butoxide), zirconium tetra(phenoxide), zirconium di(isopropoxide) bis(2-ethoxyethoxide), zirconium tetra (methoxide), zirconium tetra(cyclohexoxide), zirconium tetra(n-octadecoxide), zirconium di(isopropoxide)bis(2-(2-n-dodecanoxyethoxy)ethoxide).

3. A method as described in claim 1 wherein the transition metal alkoxide is selected from the group consisting of chromium, niobium, hafnium alkoxides selected from the group consisting of di-i-propyl chromate, diethyl chromate, dimethyl chromate, di-n-butyl chromate, di-n-octadecyl chromate, bis(2-ethoxyethyl) chromate, bis(2-(2-dodecanoxyethoxyethyl) chromate; niobium pentaethoxide dimer, niobium penta-n-propoxide dimer, niobium penta-i-propoxide dimer, niobium penta-n-butoxide dimer, niobium penta-n-octadecoxide dimer, niobium tri(isopropoxide)bis(2-ethoxyethoxide) dimer and monomer, niobium (isopropoxide) (2-ethoxyethoxide) dimer and monomer, niobium (isopropoxide)(2-(2-n-dodecanoxyethoxy) ethoxide dimer and monomer, niobium pentamethoxide dimer; hafnium tetra(isopropoxide), hafnium tetra(n-butoxide), hafnium tetra(phenoxide), hafnium di(isopropoxide) bis(2-ethoxyethoxide), hafnium tetra (methoxide), hafnium tetra (cyclohexoxide), hafnium tetra(n-octadecoxide), hafnium di(isopropoxide) bis(2-(2-n-dodecanoxyethoxy)ethoxide).

4. A method as described in claim 1 wherein the transition metal alkoxide is molybdenum, tungsten or tantalum alkoxides selected from the group consisting of tungsten hexaphenoxide (W(OPh)$_6$), disodium hexamolybdenum tetradecamethoxide (Na$_2$ [Mo$_6$(OMe)$_8$](OMe)$_6$; tantalum pentaethoxide dimer, tantalum penta-n-propoxide dimer, tantalum penta-i-propoxide dimer, penta-n-butoxide dimer, tantalum pent-n-octadecoxide dimer, tantalum tri(isopropoxide) bis(2-ethoxyethoxide) dimer and monomer, tantalum (isopropoxide) (2-ethoxyethoxide) dimer and monomer (mixture of alkoxide substitution), tantalum (isopropoxide)(2-(2-n-dodecanoxyethoxyethoxide) dimer or monomer, tantalum pentamethoxide dimer.

5. A method as described in claim 4 wherein the solution is chlorinated with a compound containing chlorine bonded to hydrogen, metal, or organic groups.

6. A method as described in claim 1 wherein the molar quantity of titanium equals or exceeds the total molar quantity of any other transition metal species.

7. A method as described in claim 6 wherein the molar ratio of titanium to other transition metal species ranges between about 1:1 to about 100:1, respectively.

8. A method as described in claim 7 when the molar ratio of magnesium to transition metal alkoxide ranges from about 0.1:1 to about 500:1 respectively.

* * * * *